US011086369B2

(12) United States Patent
Park et al.

(10) Patent No.: US 11,086,369 B2
(45) Date of Patent: Aug. 10, 2021

(54) DISPLAY ROTATION LOCKING MECHANISM

(71) Applicant: Microsoft Technology Licensing, LLC, Redmond, WA (US)

(72) Inventors: Daniel Clark Park, Woodinville, WA (US); David Kazmierz Szczypinski, Bothell, WA (US); Brett Andrew Tomky, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 16/438,042

(22) Filed: Jun. 11, 2019

(65) Prior Publication Data

US 2020/0333854 A1  Oct. 22, 2020

Related U.S. Application Data

(60) Provisional application No. 62/834,862, filed on Apr. 16, 2019.

(51) Int. Cl.
*F16M 11/00* (2006.01)
*G06F 1/16* (2006.01)
*F16M 11/12* (2006.01)

(52) U.S. Cl.
CPC .......... *G06F 1/1679* (2013.01); *F16M 11/12* (2013.01)

(58) Field of Classification Search
CPC ............... F16M 11/08; F16M 11/2014; F16M 2200/02; F16M 2200/021; F16M 2200/024
USPC .................................. 248/125.7, 131, 349.1
See application file for complete search history.

(56) References Cited

U.S. PATENT DOCUMENTS

| | | | |
|---|---|---|---|
| 5,708,561 A | 1/1998 | Huilgol et al. | |
| 6,189,850 B1 | 2/2001 | Liao et al. | |
| 6,522,529 B1 | 2/2003 | Huilgol et al. | |
| 7,082,028 B2 | 7/2006 | Huilgol et al. | |
| 7,430,113 B2 | 9/2008 | McRight et al. | |
| 7,499,267 B2 | 3/2009 | Kumano et al. | |
| 7,762,513 B2 * | 7/2010 | Sawai | F16M 11/18 248/349.1 |
| 8,094,244 B2 * | 1/2012 | Sawai | F16M 11/10 348/836 |
| 8,368,821 B2 * | 2/2013 | Yokota | F16M 11/18 348/836 |
| 9,226,580 B2 * | 1/2016 | Wang | A47B 91/005 |

(Continued)

OTHER PUBLICATIONS

"Non Provisional Application Filed in U.S. Appl. No. 16/360,707", filed Mar. 21, 2019, 54 Pages.

(Continued)

*Primary Examiner* — Steven M Marsh
(74) *Attorney, Agent, or Firm* — Alleman Hall Creasman & Tuttle LLP

(57) ABSTRACT

Examples are disclosed that relate to locking mechanisms, display assemblies, and methods for modifying a mounting assembly of a display assembly to enable rotation of a display. In one example, a locking mechanism comprises a lock block mounted for rotation with the display. The locking mechanism also comprises a lever rotatably coupled to a plate of the mounting assembly. The lever comprises a lock tab that blocks movement of the lock block when the lever is in a locked position and allows movement of the lock block when the lever is in an unlocked position.

20 Claims, 15 Drawing Sheets

(56) References Cited

U.S. PATENT DOCUMENTS

| | | | | |
|---|---|---|---|---|
| 2005/0194509 A1* | 9/2005 | Tsai | ................... | F16M 11/08 |
| | | | | 248/349.1 |
| 2007/0064379 A1 | 3/2007 | Shin | | |
| 2007/0252064 A1* | 11/2007 | Kameoka | ............... | F16M 11/18 |
| | | | | 248/349.1 |
| 2008/0061204 A1 | 3/2008 | Chang | | |
| 2008/0272262 A1* | 11/2008 | Katsumata | ............. | F16M 11/08 |
| | | | | 248/349.1 |
| 2009/0101785 A1* | 4/2009 | Jan | ................... | G03B 21/54 |
| | | | | 248/349.1 |

OTHER PUBLICATIONS

"Dell 19 Monitor: P1917S", Retrieved From: https://www.dell.com/si/business/p/dell-p1917s-monitor/pd, 2 Pages.

"International Search Report and Written Opinion Issued in PCT Application No. PCT/US2020/025861", dated Jul. 20, 2020, 11 Pages.

\* cited by examiner

DISPLAY ROTATION LOCKING MECHANISM

CROSS REFERENCE TO RELATED APPLICATIONS

This application claims priority to U.S. Provisional Patent Application Ser. No. 62/834,862, filed Apr. 16, 2019, the entirety of which is hereby incorporated herein by reference for all purposes.

BACKGROUND

Some display devices may include mechanical structures that enable a display to rotate. For example, a rotating display device may be mounted on a wall, a desk or a floor-based stand via a mounting assembly that enables users to rotate the display device. In this manner, users may view and interact with content on the rotating display device at any one of a plurality of display orientations. In some examples, such as displays that are incapable of rotating displayed content to match device rotation, enabling device rotation could provide a negative user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to locking mechanisms, display assemblies, and methods for modifying a mounting assembly of a display assembly to enable rotation of a display. In one example, a locking mechanism comprises a lock block mounted for rotation with the display. The locking mechanism also comprises a lever rotatably coupled to a plate of the mounting assembly. The lever comprises a lock tab that blocks movement of the lock block when the lever is in a locked position and allows movement of the lock block when the lever is in an unlocked position.

Another example provides a display assembly comprising a mounting assembly, a display rotatably coupled to the mounting assembly, a removeable cartridge comprising at least one protrusion, and a locking mechanism. The locking mechanism comprises a lock block mounted for rotation with the display. The locking mechanism also comprises a lever rotatably coupled to a plate of the mounting assembly. The lever comprises a lock tab that blocks movement of the lock block when the lever is in a locked position and allows movement of the lock block when the lever is in an unlocked position. The lever also comprises a latch bolt. The protrusion of the removeable cartridge is configured to either (1) engage the latch bolt to move the lever into the locked position or (2) engage the latch bolt to move the lever into the unlocked position.

Another example provides a method for modifying a mounting assembly of a display assembly to enable rotation of a display. The method comprises removing a removeable cartridge from the mounting assembly to disengage a locking protrusion of the removeable cartridge from a latch bolt of a locking mechanism. When the locking protrusion is disengaged from the latch bolt, a lever of the locking mechanism is moved from a locked position to an unlocked position. The lever comprises a lock tab blocking motion of a lock block that is fixedly coupled to the display when the lever is in the locked position. When the lever of the locking mechanism is moved to the unlocked position, the lock tab is moved from blocking motion of the lock block, and rotation of the display is enabled.

DETAILED DESCRIPTION

Some display devices may include mechanical structures that enable a display to rotate. Some examples of rotatable display devices include all-in-one computing devices, electronic whiteboards and other interactive collaboration devices. Such devices may be mounted on a wall, a floor-based stand, a rolling cart, or any other suitable surface or object via a mounting assembly that enables users to rotate the display. In this manner, the users may view and interact with content on the rotating display device at any one of a plurality of display orientations, such as portrait and landscape orientations.

In some examples, such as displays that are incapable of rotating displayed content to match device rotation, enabling device rotation could provide a negative user experience. For example, if a user rotates the display device 90 degrees from a landscape orientation to a portrait orientation, the displayed content may also be rotated 90 degrees onto its side along with the display. This may make the content difficult to view or comprehend.

For example, a user may purchase a display device that has a rotatable display. The display device may initially be shipped with a computing system that is not capable of rotating displayed content. In some examples, the computing system may be later updated or upgraded to enable rotation of displayed content. In these examples, it may be desirable to selectively disable and enable rotation of the display to match the capabilities of the computing system. One method of disabling/enabling rotation may include using one or more removeable fasteners, such as screws or bolts, to fasten the display in place. However, such fasteners may be difficult to access and to selectively secure and release if the user desires to enable/disable device rotation.

Accordingly, examples are disclosed that relate to a locking mechanism for a display assembly that selectively allows rotation of a display. As described in more detail below, a removeable cartridge may include one or more protrusions that engage the locking mechanism to enable/disable device rotation The locking mechanism includes a lock block mounted for rotation with the display and a lever comprising a lock tab that blocks movement of the lock block (and thus the display) when the lever is in a locked position. The lock tab allows movement of the lock block when the lever is moved to an unlocked position. Additionally, the lever may be configured so that a protrusion on the removeable cartridge may either (1) engage the latch bolt to move the lever into the locked position, or (2) engage the latch bolt to move the lever into the unlocked position. In this manner, the locking mechanism may selectively enable or prevent rotation of the display.

Figure 1A:
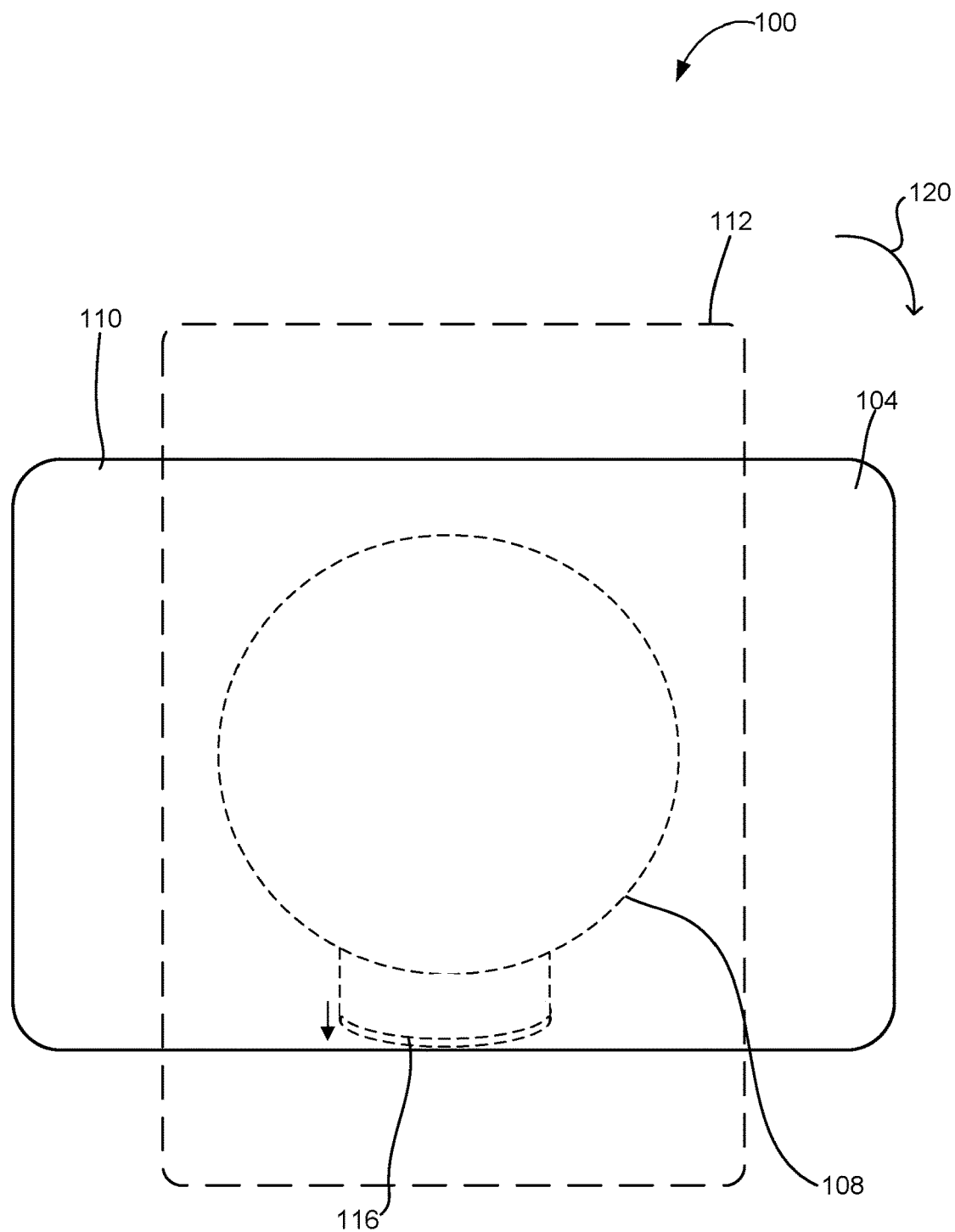
FIGS. 1A and 1B illustrate an example of a display assembly according to examples of the present disclosure.
Figure 1B:
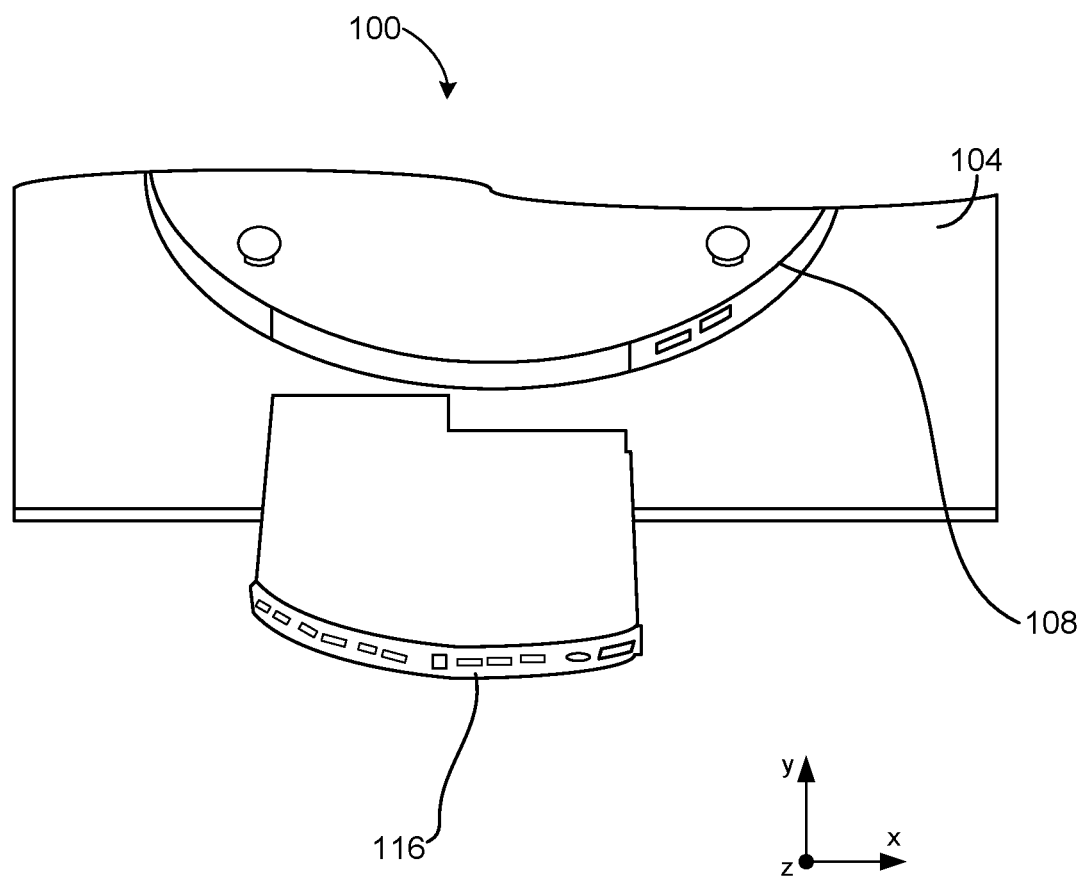

With reference now to FIGS. 1A and 1B, one example of a display assembly 100 is provided in the form of an electronic whiteboard. The example of the display assembly 100 is provided for purposes of illustration and is not intended to be limiting. Other examples to which the present disclosure may apply, such as televisions, computer monitors, and all-in-one computing devices, may have different shapes, different sizes, and different numbers and/or placements of features as compared to the display assembly 100 shown in FIGS. 1A and 1B.

Figure 2:
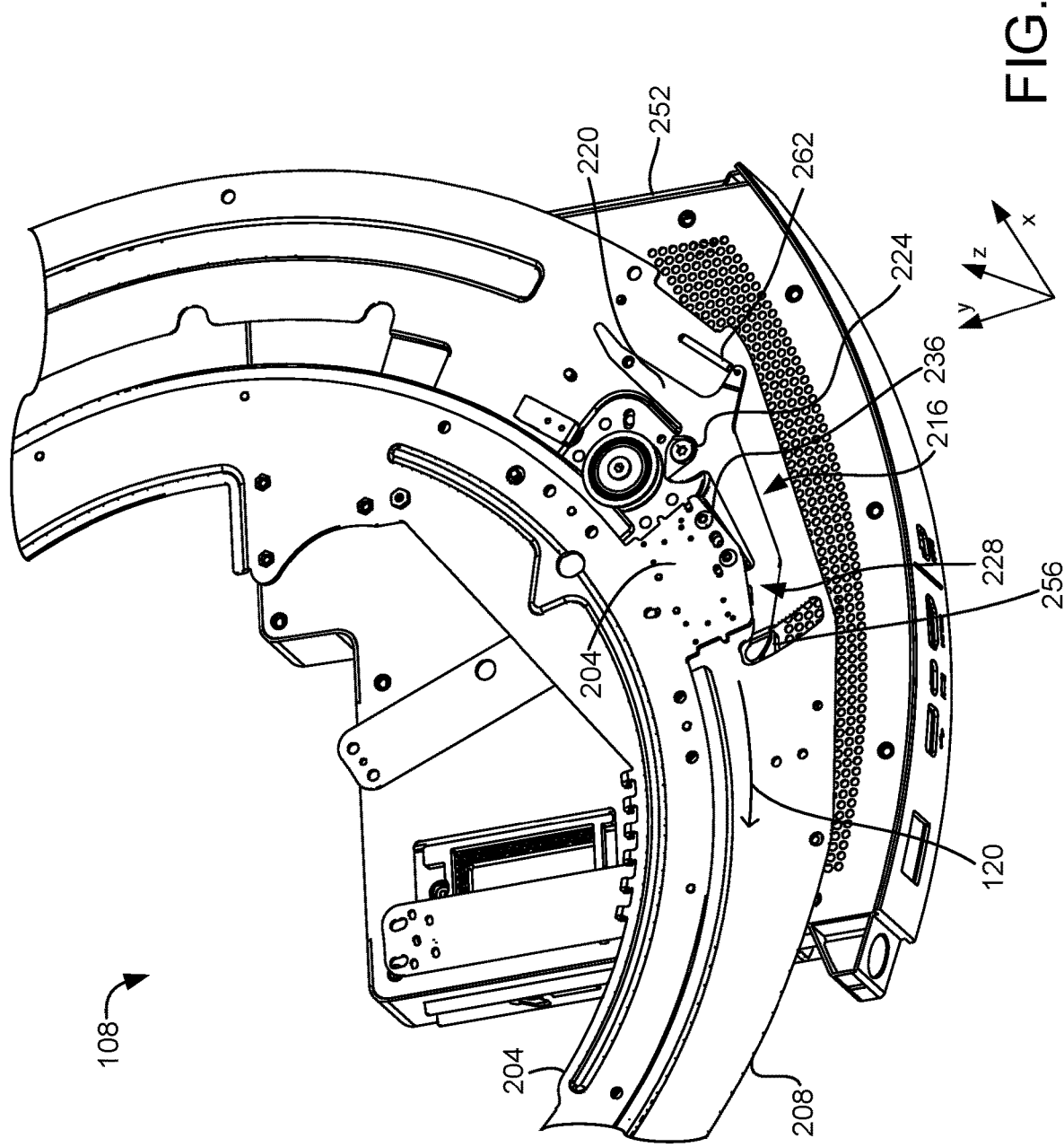
FIG. 2 illustrates a portion of the display assembly of FIG. 1 comprising a removeable cartridge and a locking mechanism in a locked configuration according to examples of the present disclosure.

The display assembly 100 includes a display 104 rotatably coupled to a mounting assembly 108. The display may utilize any suitable display technology, such as LED, OLED, LCD, LCoS, etc. The mounting assembly 108 may be coupled to a wall, to a mounting stand, to a rolling cart, or to another suitable anchor surface. The mounting assembly 108 may include one or more structures configured to enable the display to rotate. For example, FIG. 2 illustrates a portion of the mounting assembly 108 that includes a rail plate 204 that is coupled to the display 104. The rail plate 204 is rotatably coupled to a roller plate 208, which may be fixed to an enclosure of the mounting assembly 108 that is coupled to a wall, mounting stand, rolling cart, or other anchor surface. In this example and with reference also to FIGS. 1A and 1B, the rail plate 204 and roller plate 208 are substantially parallel to an X-Y plane in which the display 104 rotates.

The rail plate 204 and the roller plate 208 may be coupled via any suitable means that enables the rail plate 204 to rotate relative to the roller plate 208. For example, the rail plate 204 and the roller plate 208 may be coupled via bearings, wheels, an interlocking rail and track, or a system of gears. In this manner, the display 104 and any other components of the display assembly 100 that are attached to the rail plate 204 may rotate relative to the roller plate 208 and the anchor surface to which the roller plate is mounted. For example, and with reference again to FIG. 1A, in some examples the display 104 may be rotatable by 90 degrees about the mounting assembly 108. In this manner, the display 104 may be rotated between a landscape orientation 110 and a portrait orientation 112.

The display assembly 100 includes a removeable cartridge 116 that is removeably inserted into the mounting assembly 108. The removeable cartridge 116 may include a computing device that generates image content for the display 104. In the example depicted in FIGS. 1A and 1B, the removeable cartridge 116 is inserted into and removed from the mounting assembly 108 behind the display 104. In this example, the removeable cartridge 116 resides in a portion of the mounting assembly that does not rotate with the display.

While the removeable cartridge 116 moves in the Y-axis direction during insertion and removal in the example depicted in FIG. 1, it will also be appreciated that the removeable cartridge may be inserted and removed in the X-axis or other direction based upon the orientation of the mounting assembly 108.

As noted above, it may be desirable to selectively enable rotation of the display 104. Accordingly, as illustrated by example in FIG. 2, the mounting assembly 108 may include a locking mechanism 216 that may selectively allow rotation of the display when the mechanism is unlocked and disable rotation of the display when the mechanism is locked.

The locking mechanism 216 includes a lock lever 220 that is rotatably coupled to the roller plate 208 of the display assembly via a pivot 224. The pivot 224 may comprise a bolt, screw, bearing, or any suitable component about which the lock lever 220 may rotate. In this manner and as described in more detail below, the lock lever 220 may move between a locked position and an unlocked position by rotating about the pivot 224.

In the example of FIG. 2, the lock lever 220 is illustrated in a locked position 228. When the lock lever 220 is in the locked position 228, a lock tab 240 (see FIG. 3) of the lever may engage with one or more components coupled to the rail plate 204 to prevent the display from rotating. More particularly and as illustrated by example in FIGS. 2 and 3, the locking mechanism 216 includes a lock block 236. The lock block 236 is fixedly coupled to the rail plate 204 such that the lock block 236 rotates with the rail plate 204 and the display. The lock block 236 may be mounted on an underside of the rail plate 204. In the example of FIGS. 2 and 3, the lock block 236 is oriented parallel to the X-Y plane and is coplanar with the lock lever 220.

When the lock lever 220 is in the locked position 228, as shown in FIGS. 2 and 3, the lock lever 220 engages with the lock block 236 to prevent rotation of the display. More particularly and as illustrated in FIG. 3A, the lock lever 220 engages with the lock block 236 via an upwardly extending lock tab 240. In the example of FIG. 3A, the lock tab 240 comprises a portion of the lock lever 220 that extends away from the lock lever in the positive Y-axis direction towards the lock block 236. As shown in FIG. 3A, when the lock lever 220 is in the locked position 228 and the display 104, rail plate 204 and lock block 236 are oriented as shown, the lock tab 240 extends in front of the lock block 236. In this manner, the lock tab 240 impedes the lock block 236 (and display 104 and rail plate 204) from moving/rotating in the clockwise direction 120. More particularly, if a user attempts to rotate the display in the clockwise direction 120, a blocking face 226 of the lock block 236 contacts the lock tab 240 to prevent the lock block 236 from moving past the lock tab.

Figure 3A:
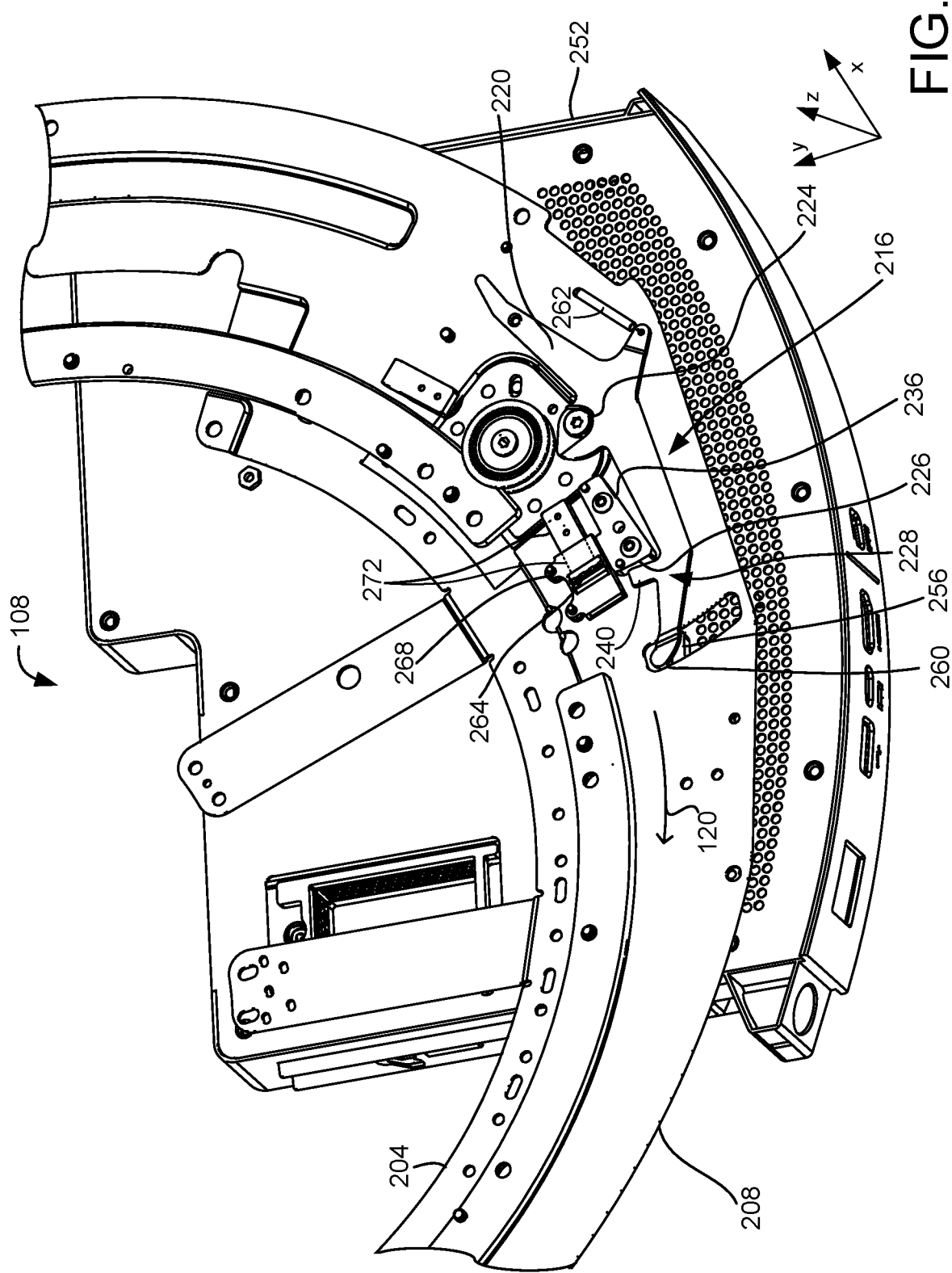
FIG. 3A depicts the display assembly of FIG. 2 with a rail plate removed.

In one example, and with reference again to FIG. 1, when the display 104 is oriented in the landscape orientation 110, the lock lever 220 is in the locked position 228 shown in FIG. 3A. Accordingly, rotation of the display 104 in the clockwise direction 120 is prevented, and the display is locked in the landscape orientation.

In the example of FIG. 3A, the lock tab 240 extends in front of the lock block 236 to block the path of travel of the lock block, and correspondingly block rotation of the display. In other examples, the lock tab 240 may engage with the lock block 236 in any other suitable manner, such as by insertion into an aperture of the lock block. In some examples and as described in more detail below, the display assembly 100 may also constrain rotation in an opposite, counter-clockwise direction.

Figure 4:
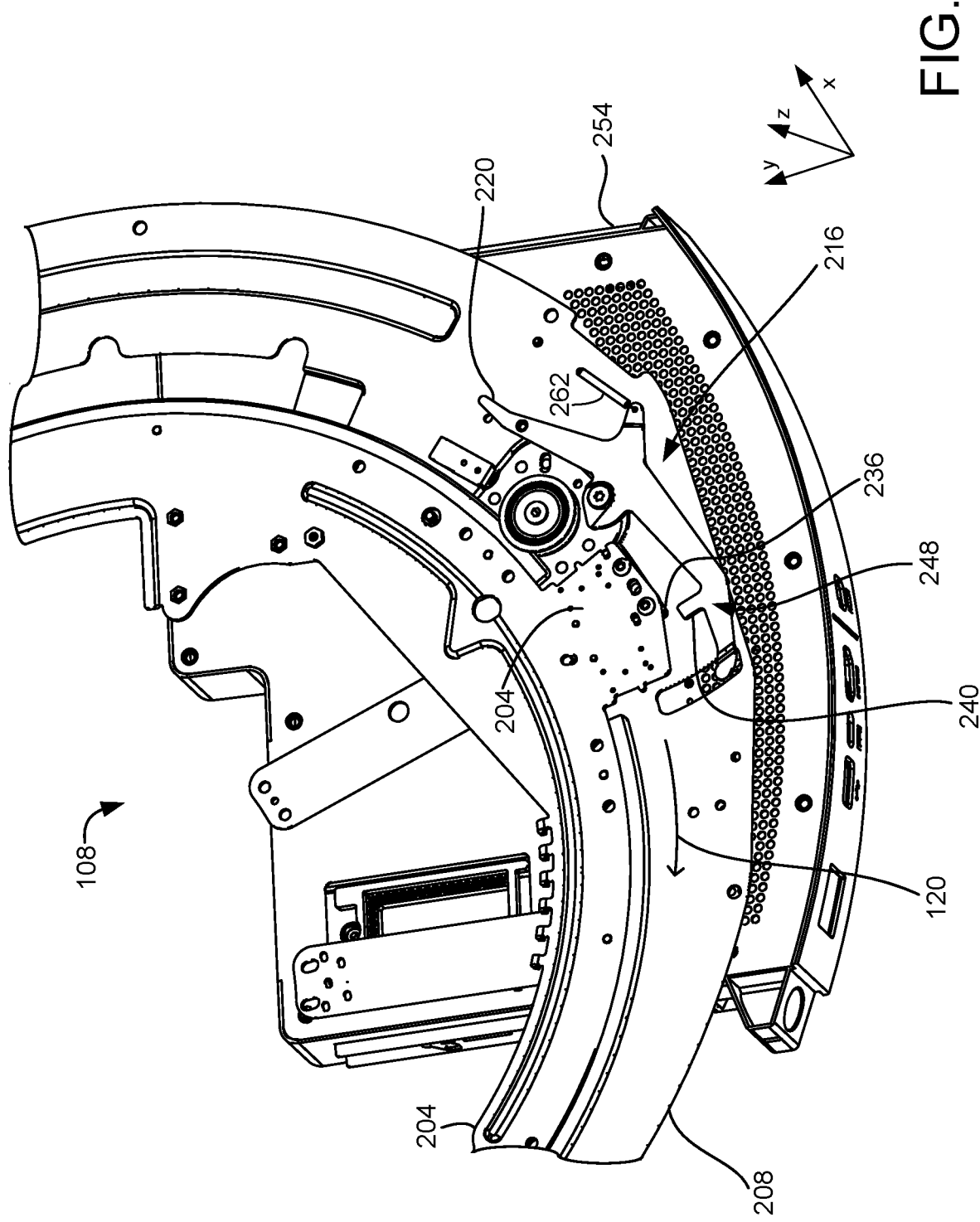
FIG. 4 shows the locking mechanism of FIG. 2 in an unlocked configuration according to examples of the present disclosure.

With reference now to FIG. 4, and as described in more detail below, the locking mechanism 216 may be pivoted to an unlocked position 248 when a user removes the removeable cartridge 252 of FIG. 3A and/or inserts a different removeable cartridge 254 as shown in FIG. 4. In the example of FIG. 4, the lock lever 220 is in an unlocked position 248 in which the lock tab 240 is not blocking movement of the lock block 236 or any other components coupled to the rail plate 204. Accordingly, the display may be rotated when the lock lever 220 is in the unlocked position 248. In this example, the lock lever is biased toward the unlocked position 248 via a spring 262. In other examples and as described below, other biasing elements may be utilized to bias the lock lever toward a locked, unlocked or centered position.

In some examples, the locking mechanism may be selectively engaged or disengaged by interacting with one or more components of the removeable cartridge. For example, and with reference to FIGS. 2, 3 and 5A, in this example the removeable cartridge 252 includes a protrusion 256 that extends outwardly in the positive Z-axis direction from the cartridge. When the removeable cartridge 252 is installed in the mounting assembly 108 in the positive Y-axis direction, as shown in FIGS. 2 and 3, the protrusion 256 engages a latch bolt 260 (see also FIG. 7) on a distal end of the lock lever 220. The protrusion 256 pushes the latch bolt 260 in the positive Y-direction as the removeable cartridge 252 is installed, thereby moving the lock lever 220 into the locked position 228 and locking the display assembly from rotation. In this manner, rotation of the display may be conveniently and selectively disabled by simply installing cartridge 252 into the display assembly.

Figure 5B:
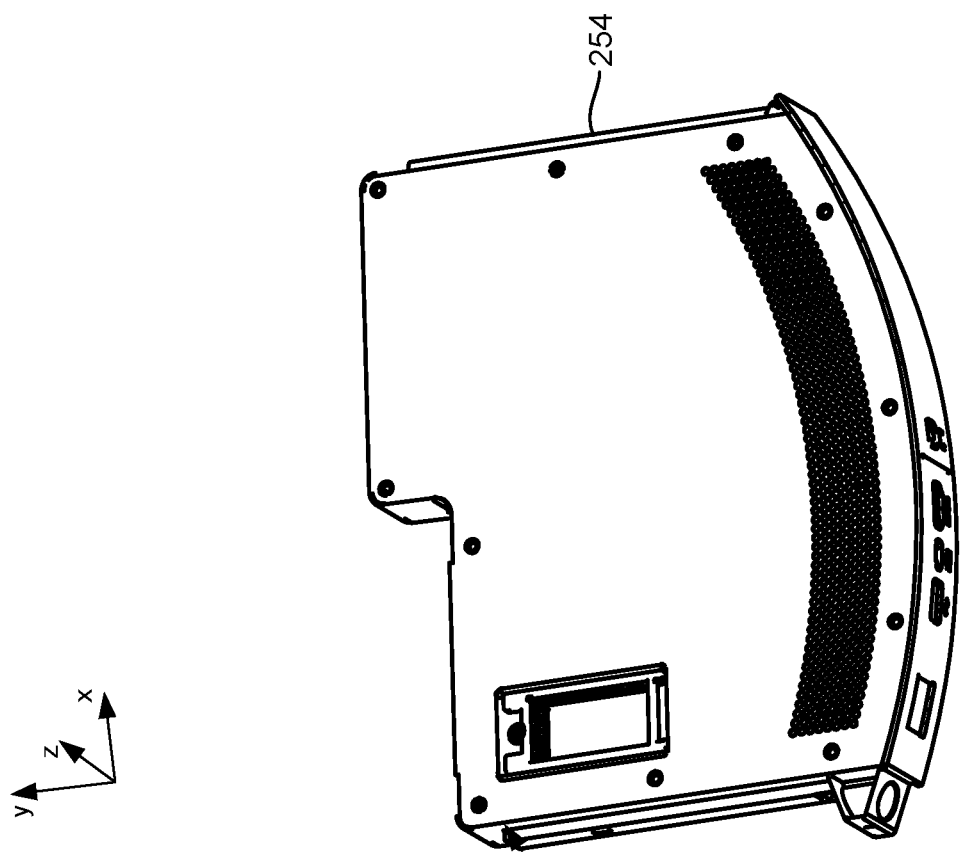
FIG. 5B shows a perspective view of a removeable cartridge according to other examples of the present disclosure

As noted above, in this example the lock lever is biased toward the unlocked position 248 via a spring 262. Accordingly, and with reference to FIGS. 4 and 5B, when a removeable cartridge 254 that does not include the protrusion 256 is inserted into the mounting assembly, the lock lever 220 remains in the unlocked position 248 and the display 100 remains free to rotate in the clockwise direction 120.

In one example, a user may remove the cartridge 252 with the protrusion 256 and then rotate the display (and lock block 236) clockwise away from 0 degrees (landscape orientation). It is possible that the user may then re-insert the same the cartridge 252 with the protrusion 256. This will rotate the lever 220 into the locked position 228, but the lock block 236 has been rotated away and is not in position. Further, rotating the display 104 and lock block 236 back into the landscape orientation while the lock lever 220 is in the locked position 228, or otherwise forcing the lock to engage, may damage one or more components of the locking mechanism.

Figure 6:
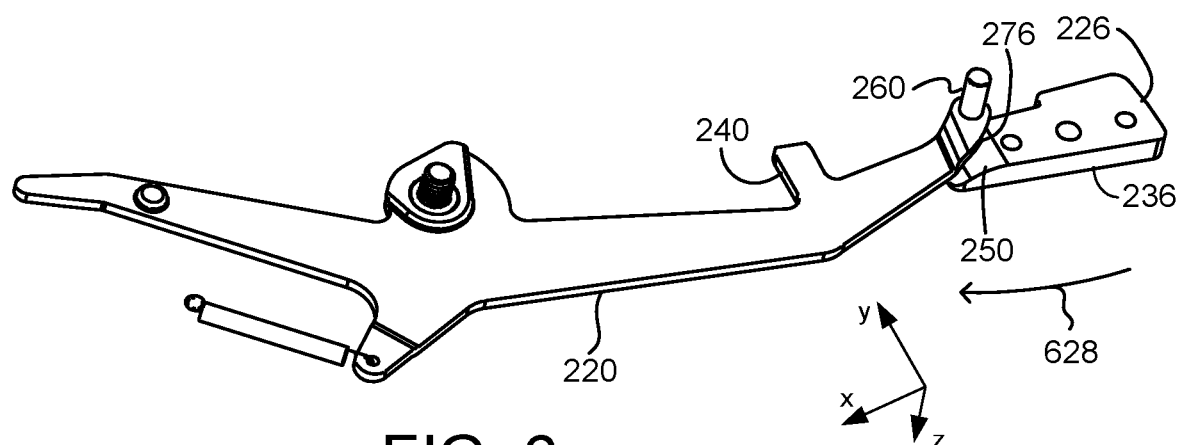
FIG. 6 shows a flipped view of the lock lever of the locking mechanism of FIGS. 2 and 3A in a locked configuration according to examples of the present disclosure.
Figure 7:
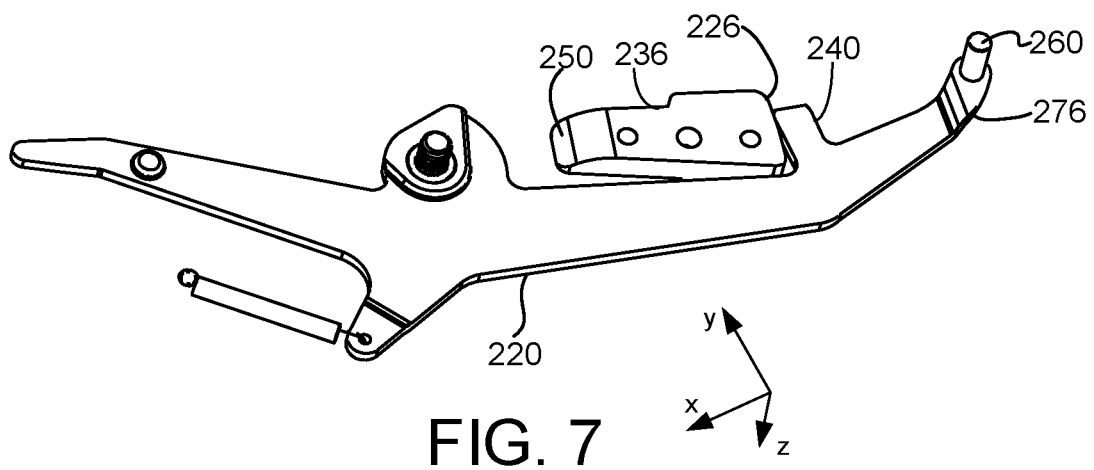
FIG. 7 shows the lock lever of FIG. 6 with a lock block engaged with a lock tab of the lever according to examples of the present disclosure.

Accordingly and in some examples, the lever 220 and lock block 236 may be configured to allow the lock block to pass over the lever and engage properly once at 0 degrees. More particularly, and with reference now to FIGS. 6 and 7, in some examples the lock block 236 may comprise at least one ramped surface 250 that enables the lock block to slide along a corresponding ramped surface 276 of the lock lever 220 from which the latch bolt 260 extends. FIGS. 6 and 7 show the lock lever 220 and lock block 236 in a view that is flipped 180 degrees about the y-axis relative to the view shown in FIGS. 2-4 to show additional details of the lock lever and lock block.

As shown in FIGS. 6 and 7, the lock block 236 comprises a ramped surface 250 at a distal end opposite the blocking face 226. The ramped surface 250 may comprise a planar or curved surface that slopes from a leading edge to a flat face of the lock block. As illustrated by example in FIG. 6, the ramped surface 250 of the lock block 236 may be configured to contact the corresponding ramped surface 276 of the lock lever 220 when the lock lever is in a locked position. The ramped surface 250 may be configured so that the lock block 236 may wedge itself underneath the lock lever 220 as shown in FIG. 6. In this manner, the lock block 236 may pass under the lock lever 220 when moved in a direction indicated by arrow 628, which may prevent jamming and enable the display to be rotated into a locked orientation.

In some examples, as the lock block 236 slides under the lock lever 220 it may slightly move the rail plate 204 and roller plate 208 apart, before the display assembly returns to its normal state once the lock block is engaged with the lock lever, as illustrated in FIG. 7. In this manner, the ramped surfaces 250 and 276 may enable the lock block 236 to slide under the lock lever 220 to reach the position shown in FIG. 7 without damaging itself, the lock lever 220, and/or other components.

Figure 3C:
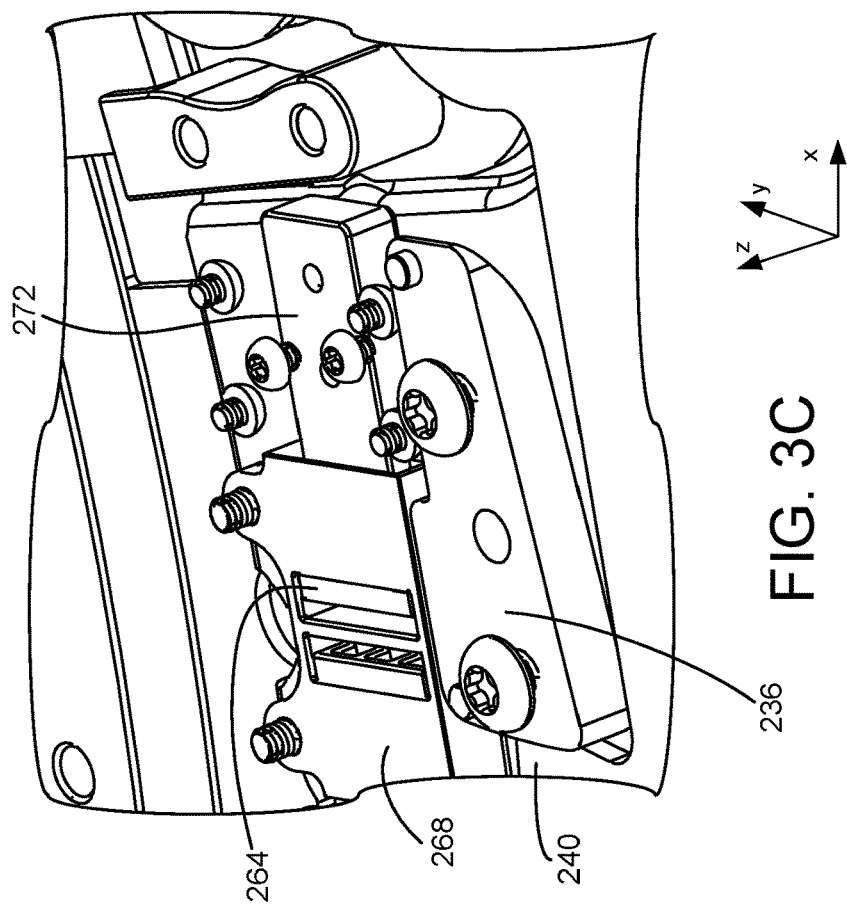
FIGS. 3B-3C depict an enlarged view of FIG. 3A showing a garage and bumper components.
Figure 3B:
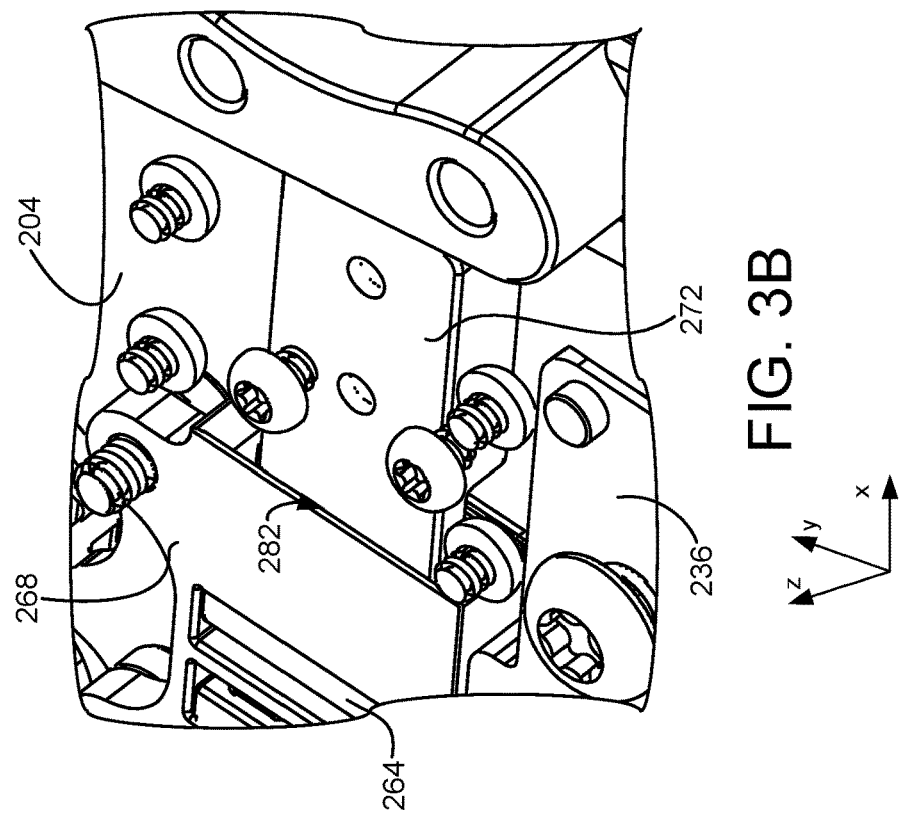

As described above, the interaction of the lock block and the lock lever may constrain rotation of the display in one direction. In some examples, it may be desirable to also constrain rotation of the display in the opposite direction. In the example of FIGS. 3A-3C, the display assembly includes a bumper 264. The bumper 264 may be housed in a garage 268 that at least partially encircles the bumper 264. The garage 268 may be secured to the rail plate 204, such that the garage and bumper 264 rotate with the display.

The display assembly 100 may also include a stop device 272 that is secured to the roller plate 208 and configured to slide into the garage 268 via an aperture 282 on a right end of the garage. More particularly, when the display 104 and rail plate 204 reach an end of their range of rotation in the counterclockwise direction, the aperture and garage receive the stop device 272 (i.e., the stop device is inserted into the garage 268) until a left end of the stop device contacts the bumper 264. The range of rotation may be set by a device manufacturer by adjusting the position of the garage 268 and/or the stop device 272. For example, the display may reach the end of the range of rotation when the lock block 236 is engaged with the lock tab 240.

The bumper 264 may comprise a compressive material, such rubber, or may take the form of a spring. In this manner, the bumper 264 may be compressed by the stop device 272.

When the bumper 264 is compressed, the bumper may exert a restorative force pushing against the stop device 272. For example, when the stop device 272 compresses the bumper 264 in the negative X-axis direction, the bumper 264 may generate a restoring force acting in the positive X-axis direction against the stop device. It will be appreciated that, in some examples, the display assembly may include a plurality of bumpers and stop devices, which may provide more uniform application of forces around the assembly.

In the locked position, pre-load between the lock block 236 and the lock tab 240 may be desired. Such a pre-loading may prevent the display from feeling loose or wobbly in the rotational directions. In some examples, the lock block 236 can be biased toward the lock tab 240 when the display assembly is manufactured. Providing such a biasing force compresses the bumper 264 and pre-loads the lock block 236 against the lock tab 240.

The restorative force provided by the bumper 264 may ensure that the lock block 236 remains in contact with the lock tab 240 while the locking mechanism 216 is engaged. In some examples, such a force may prevent the lock tab 240 and the lock block 236 from disengaging immediately when the removeable cartridge 252 is removed, as in examples where the lock lever is biased towards the unlocked position. In these examples, the lock tab 240 and the lock block 236 may be disengaged after removing or replacing the removeable cartridge 252 by compressing the bumper 264 further, such as by slightly rotating or biasing the display in the counterclockwise direction, thereby enabling the lock lever 220 to freely pivot. In other examples and as described below, a removeable cartridge may comprise an unlocking protrusion that upon insertion engages the lock lever 220 to move the lever to the unlocked position.

In different configurations, the lock lever 220 may be biased towards the unlocked position by at least one biaser. The biaser may comprise any suitable component(s), such as a spring, magnets, or a cam and follower, that bias the lock lever 220 towards the unlocked position 248. In the example shown in FIGS. 2-4, the lock lever 220 is biased toward the unlocked position 248 via a spring 262. In other examples, as described in more detail below, the biaser 262 may be configured to bias the lock lever 220 towards the locked position 228 or towards a centered position between the locked position 228 and the unlocked position 248.

Figure 3D:
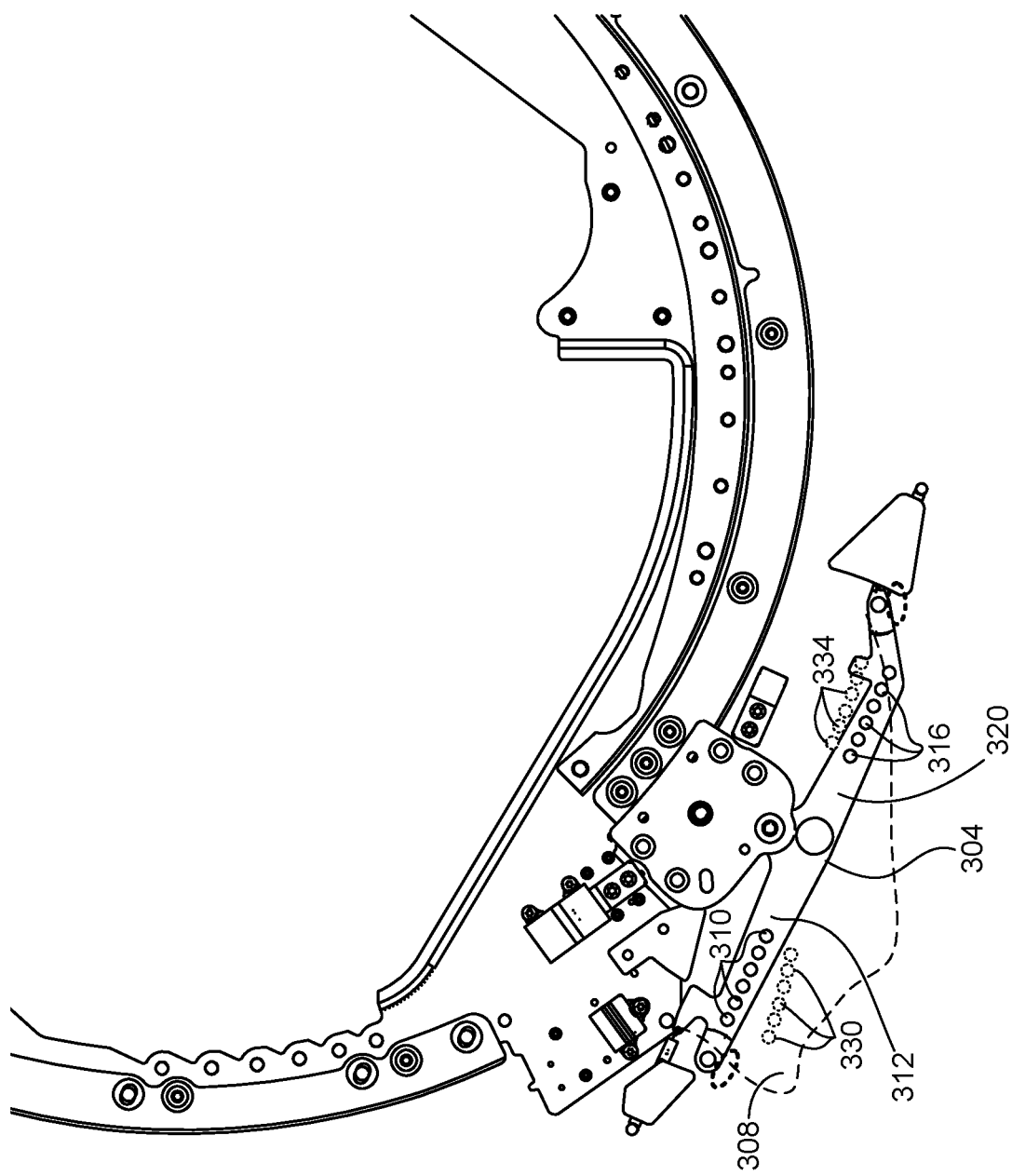
FIG. 3D shows another example of a locking mechanism and lock lever according to examples of the present disclosure.

In another example and with reference to FIG. 3D, one or more magnets may be utilized to provide a biasing force to a lock lever. In the example of FIG. 3D, a lock lever 304 rotatably coupled to a roller plate 308 comprises a first series of magnets 310 on a first arm 312 and a second series of magnets 316 on an opposing second arm 320. The roller plate 308 underlying the lock lever 304 includes a corresponding first series of magnets 330 and a second series of magnets 334. In one example the lock lever magnets 310, 316 have a polarity opposite to the rail plate magnets 330, 334 to thereby attract the rail plate magnets and bias the lock lever to an unlocked position. In another example, the lock lever magnets 310, 316 have the same polarity as the rail plate magnets 330, 334 to thereby repel the rail plate magnets and bias the lock lever to a locked position.

Figure 3E:
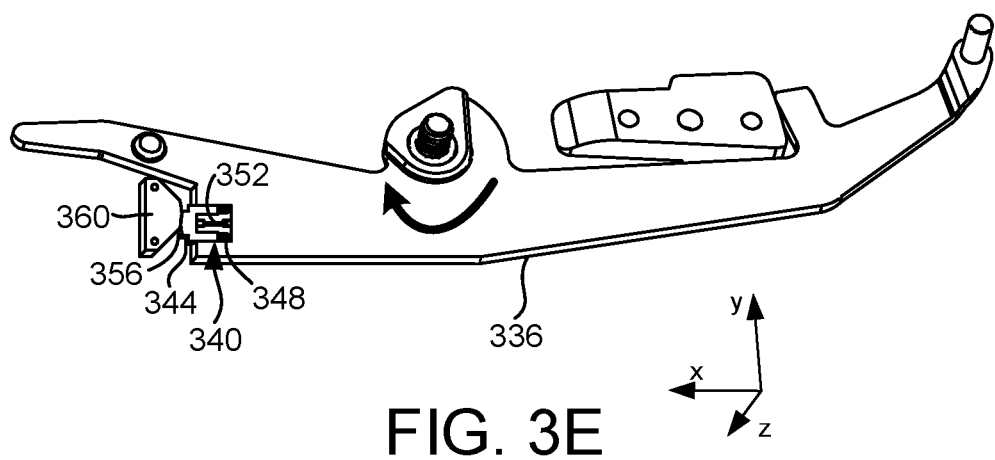
FIG. 3E shows an example of a cam and follower according to examples of the present disclosure.

In yet another example and with reference to FIG. 3E, a cam and follower system may be utilized to provide a biasing force to a lock lever. In the example of FIG. 3E, a lock lever 336 comprises a slot 340. A follower device 344 is positioned within the slot 340. The follower 344 may be mounted on one or more rails 348 or grooves within the slot 340 to travel along the x-axis. The follower 344 may be loaded by a spring 352 such that a contact surface 356 of the follower 344 is biased against a cam 360. In this manner, the follower 344 may push against the cam 360 with a force that biases the lock lever 336 in a locked or unlocked position.

In some examples and with reference again to FIG. 4, by biasing the lock lever 220 towards the unlocked position 248, the display 104 may be enabled for rotation by default. For example, the display may be unlocked for rotation when the removeable cartridge 252 is removed/not installed, or when the removeable cartridge 254 that does not include the protrusion 256 is utilized (as shown).

Figure 8:
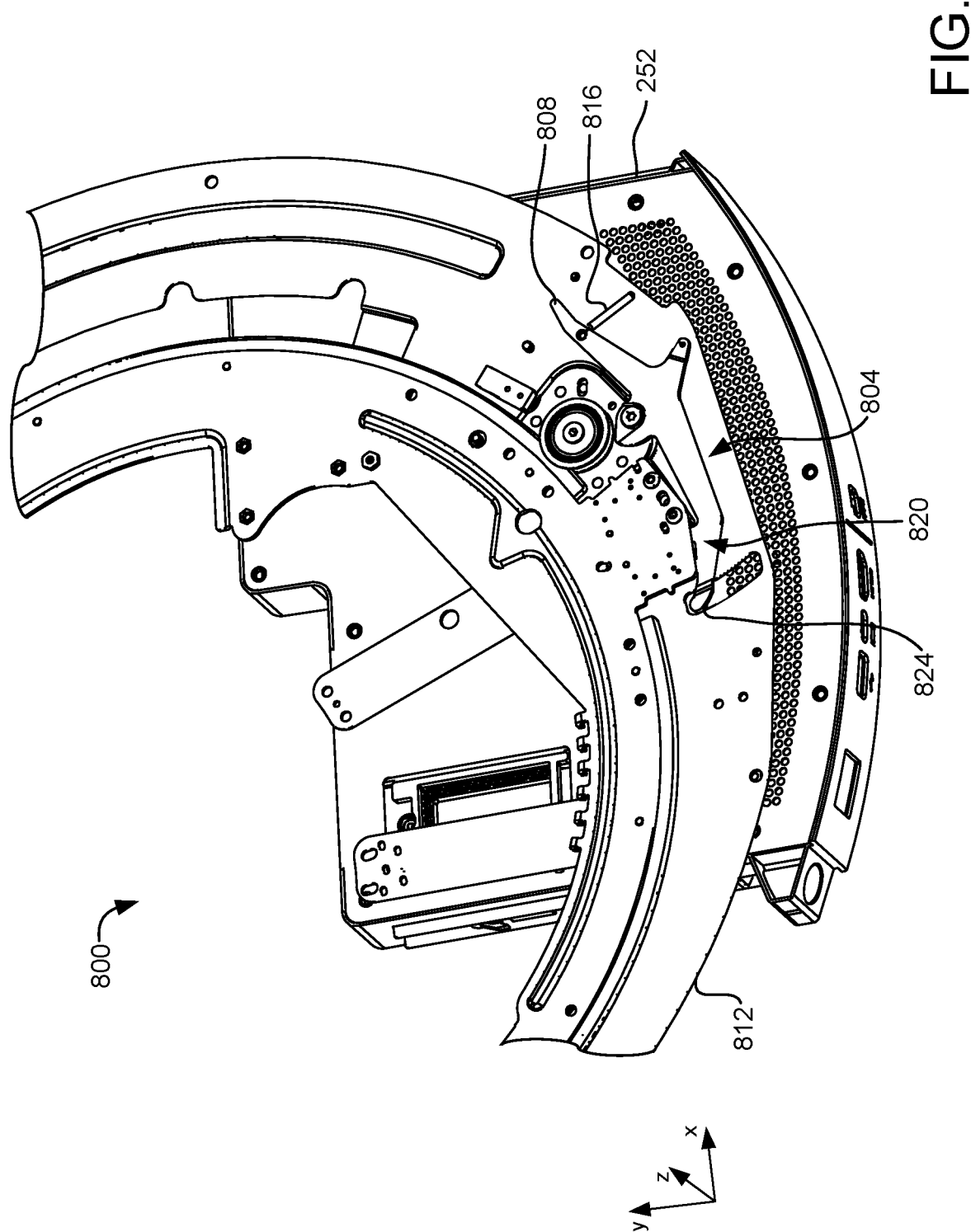
FIG. 8 shows another example of a display assembly and locking mechanism according to examples of the present disclosure.

In other examples, the lock lever may be biased towards the locked position. FIG. 8 shows another example of a portion of a mounting assembly 800. The mounting assembly 800 includes a locking mechanism 804 having substantially the same configuration as locking mechanism 216 described above. The locking mechanism 804 comprises a lock lever 808 having substantially the same configuration as lock lever 220. Like the lock lever 220 in the example of FIGS. 2-4, the lock lever 808 is rotatably coupled to a roller plate 812 of the mounting assembly 800. In this example, the locking mechanism 804 includes a locking spring 816 configured to bias the lock lever 808 towards the locked position 820. Accordingly, in this configuration the mounting assembly 800 may remain locked by default. For example, the display 104 will be locked from rotation when the removeable cartridge 252 is removed, or when a different removeable cartridge lacking protrusion 256 is installed.

Figure 9:
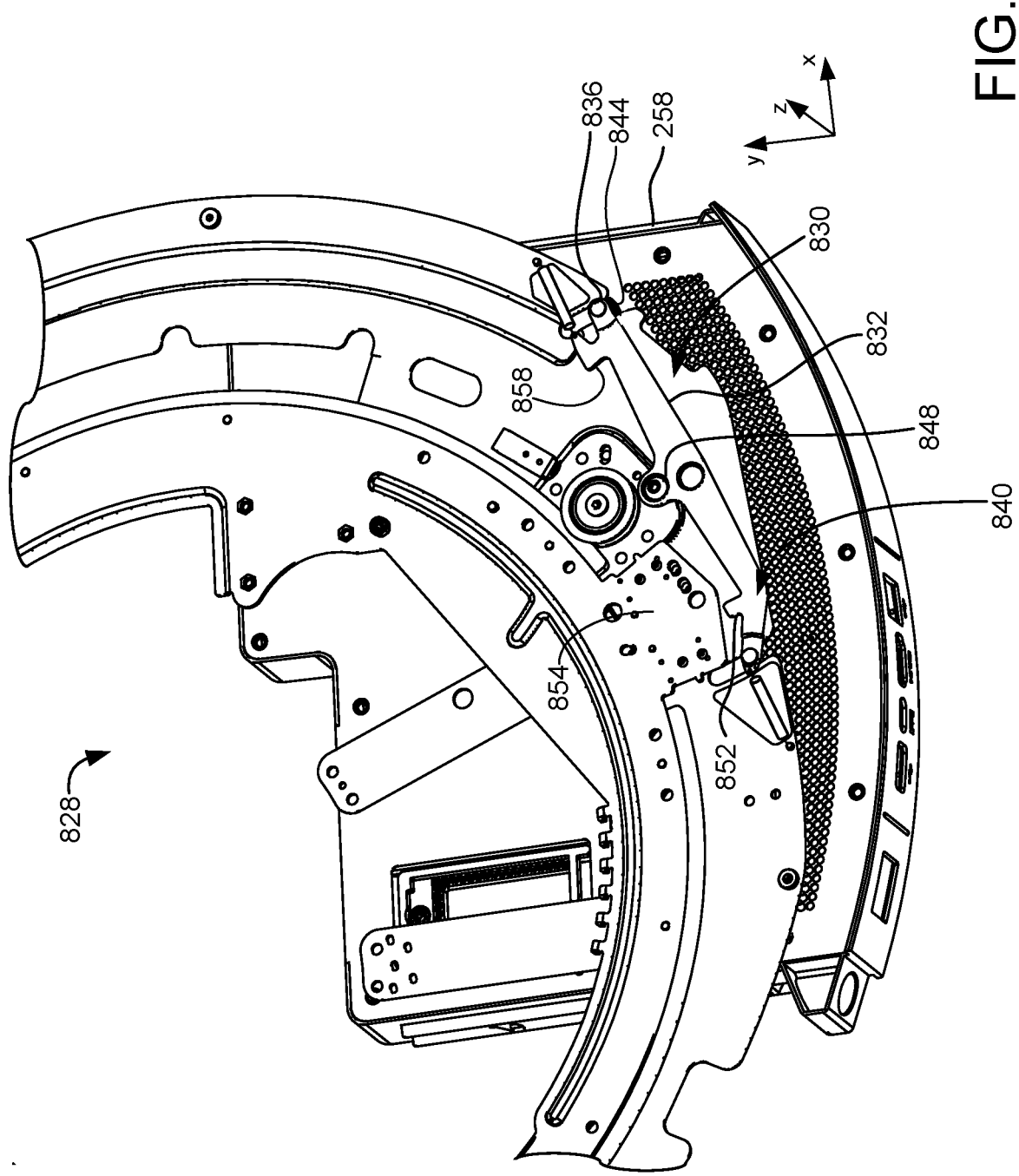
FIG. 9 shows another example of a display assembly and locking mechanism according to examples of the present disclosure.

In some configurations where the lock lever is biased towards the locked position, the lock lever may be disengaged and rotation of the display enabled by installing a removeable cartridge having an unlocking protrusion that engages and moves the lock lever to an unlocked position. For example, FIG. 9 shows another example of a portion of a mounting assembly 828 having a locking mechanism 830 comprising a lock lever 832 that is normally biased towards the locked position in which lock tab 852 is moved upwardly behind rail plate 854 to abut a lock block (not shown). In the example of FIG. 9, the locking mechanism may be unlocked by engaging a first latch bolt 836 of the lock lever 832 with an unlocking protrusion on a removeable cartridge to move the lever into the illustrated unlocked position 840.

Figure 11B:
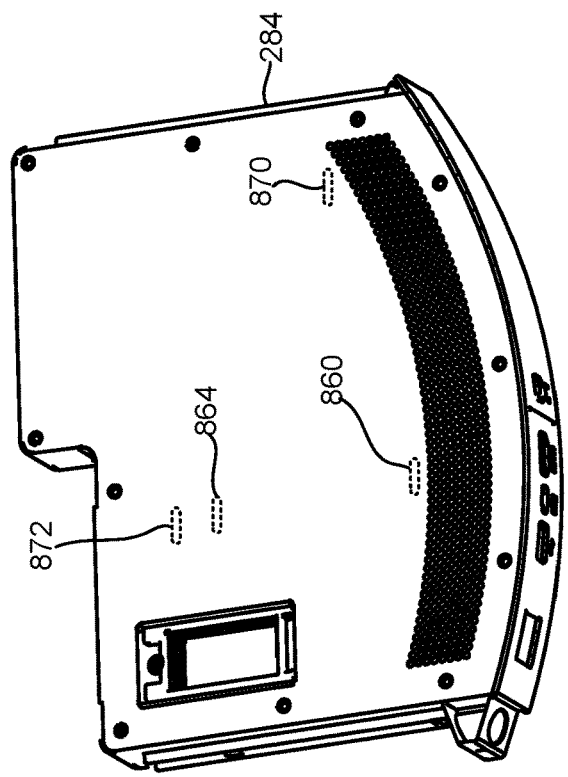
FIGS. 11A-11B show examples of removeable cartridges according to examples of the present disclosure.

For example and with reference also to FIG. 11B, a removeable cartridge 258 may comprise an unlocking protrusion 844 configured to engage and move the first latch bolt 836 when the cartridge is installed. When the removeable cartridge 258 is installed, as shown in the example of FIG. 9, the unlocking protrusion 844 may engage with latch bolt 836 to push the latch bolt 836 in the positive Y-axis direction, causing rotation of the lever 832 about pivot 848 and translation of lock tab 852 in the negative Y-direction, towards the unlocked position 840. In this manner, the display assembly 828 may be unlocked, allowing the display to rotate.

In some examples where the lock lever is biased towards the locked position, a removeable cartridge may be utilized that comprises one or more locking protrusions to ensure that the display assembly remains locked from rotation when the cartridge is installed.

In other examples and as described in more detail below, the lock lever 832 may be biased towards a centered position, in which the lock lever is neither fully engaged in a locked position nor in an unlocked position. In these examples, and in examples where the lock lever is already biased towards an unlocked position, one or more unlocking protrusions may be provided on the removeable cartridge to ensure that the display assembly remains unlocked.

As noted above, in different configurations the display 104 may be locked in a variety of desired orientations. For example, the display assembly 828 shown in FIG. 9 may additionally or alternatively be configured such that the lock lever 832 locks the display when the display is in a portrait orientation. In some examples, one or more lock blocks may be positioned at different locations around the display assembly.

Figure 10:
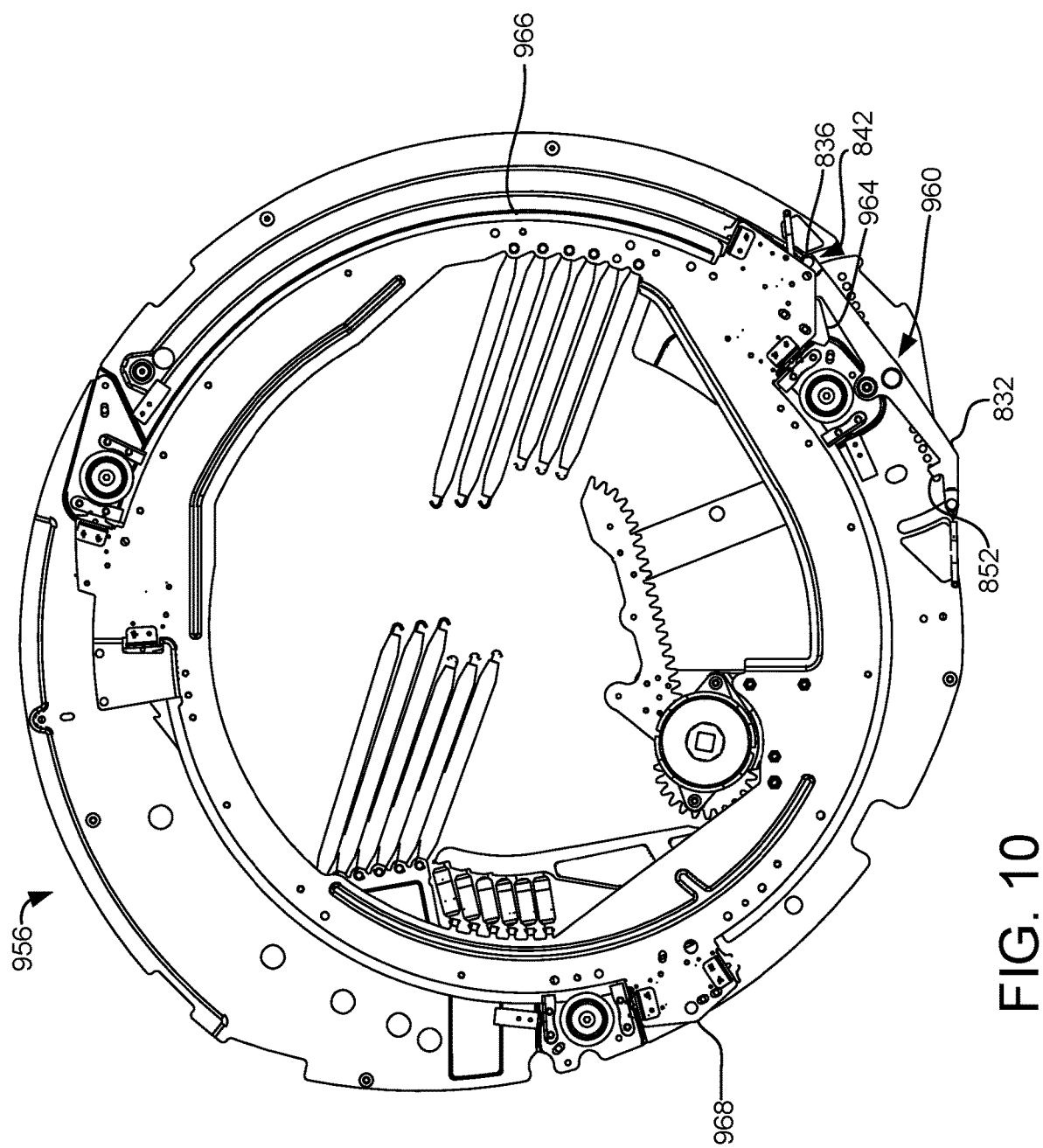
FIG. 10 shows another example of a display assembly including a locking mechanism according to examples of the present disclosure.

For example, FIG. 10 shows another example of a mounting assembly 956. The mounting assembly 956 may include a locking mechanism 960, which may comprise the locking mechanism 830 described above with reference to FIG. 9. The mounting assembly 956 may also include a portrait lock block 964 affixed to rail plate 966 in a region that is approximately 90 degrees offset from a landscape lock block 968. In this manner, the locking mechanism 960 may engage the portrait lock block 964 to lock the display when the display is rotated 90 degrees clockwise from the landscape orientation to the portrait orientation.

In the example of FIG. 10, the lock lever 832 is illustrated as being in a landscape unlocked/portrait locked position, in which the left lock tab 852 is pivoted downwardly and the right lock tab 858 (see FIG. 9) is pivoted in the opposite direction upwardly to engage a portrait lock block 964. Accordingly, in this configuration the locking mechanism 960 engages the portrait lock block 964 to lock the display in the portrait orientation.

In some examples, the mounting assembly 956 also receives a removeable cartridge as described above. The removeable cartridge may comprise at least one protrusion to either lock or unlock the locking mechanism 960. For example, the removeable cartridge 258 described above with reference to FIG. 9 comprises one protrusion 844 that may be configured to engage the locking mechanism 960 to lock the display in the portrait orientation by engaging with latch bolt 836 to move the lock tab 858 upwardly to engage with the portrait lock block 964.

In other examples, a removeable cartridge and corresponding protrusion may be configured in any suitable manner to lock the display in the portrait orientation or the landscape orientation. For example and with reference also to FIG. 5A, removeable cartridge 252 may be utilized with mounting assembly 956 such that protrusion 256 engages with latch bolt 862 on lock lever 832 to pivot lock tab 852 upwardly and lock the display in the landscape orientation. Additionally and in different examples, the mounting assembly 956 may be oriented and secured to an anchor surface such that the removeable cartridge 252 is inserted and removed vertically in a y-axis direction or horizontally in an x-axis direction.

Figure 11A:
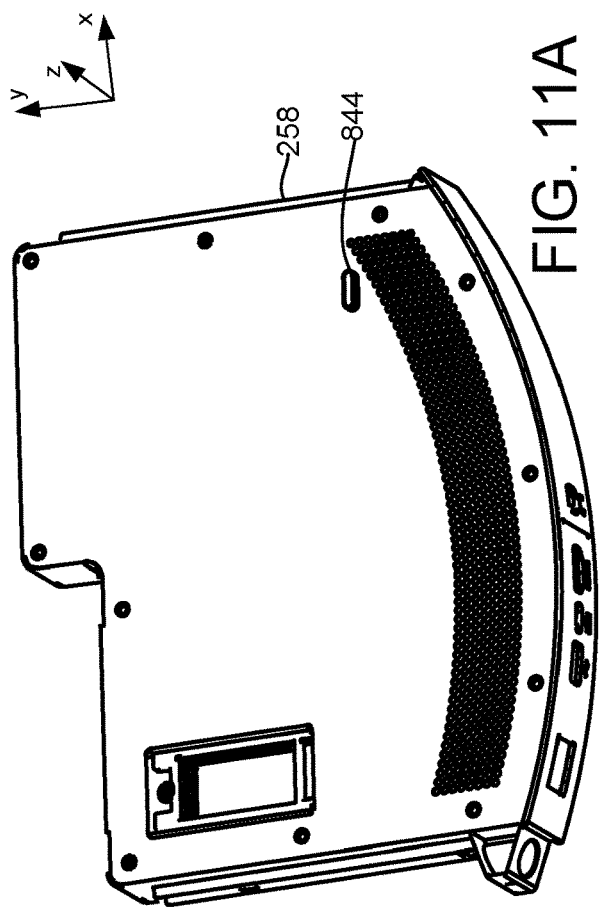

It will also be appreciated that a variety of other combinations of display assemblies, locking mechanisms, and configurations of protrusions on removeable cartridges may be utilized for selectively allowing rotation of the display, and selectively locking and unlocking rotation. For example, and as noted above, the cartridge 258 shown in FIG. 11A comprises a protrusion 844 that may engage a landscape locking mechanism and unlock the display from the landscape orientation.

In some examples and with reference to FIG. 11B, a removeable cartridge 284 may comprise one or more apertures configured to removeably receive a protrusion at different locations on the cartridge. In this manner, a user may configure the removeable cartridge 284 with protrusions in different locations to lock or unlock the display in any suitable orientation (e.g. portrait or landscape). For example, the removeable cartridge 284 may comprise an aperture 870 configured to receive protrusion 844 (see also FIG. 11A). The removeable cartridge 284 may optionally comprise one or more additional apertures, such as apertures 860, 864 and 872, that may receive protrusions configured to interact with locking mechanisms having different locking functionalities. In different examples, the protrusions may be removeable by a user or by an authorized support technician.

Figure 5A:
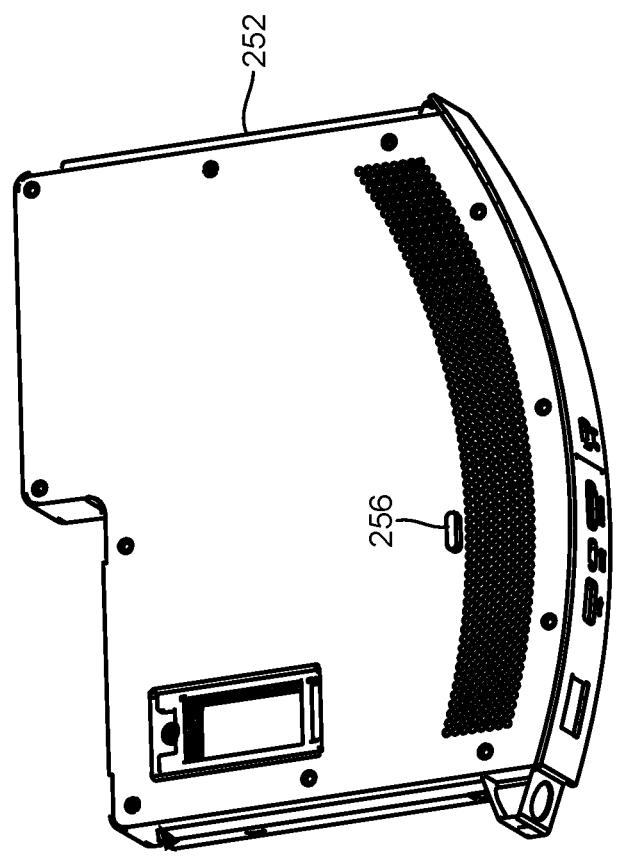
FIG. 5A shows a perspective view of a removeable cartridge according to examples of the present disclosure.

For example, a user may install a protrusion in aperture 860, which is located in the same position as the protrusion 256 in the removeable cartridge 252 depicted in FIG. 5A. In this manner, the removeable cartridge 284 may be configured to lock the mounting assembly 956 of FIG. 10 in the portrait or landscape orientation.

Figure 12:
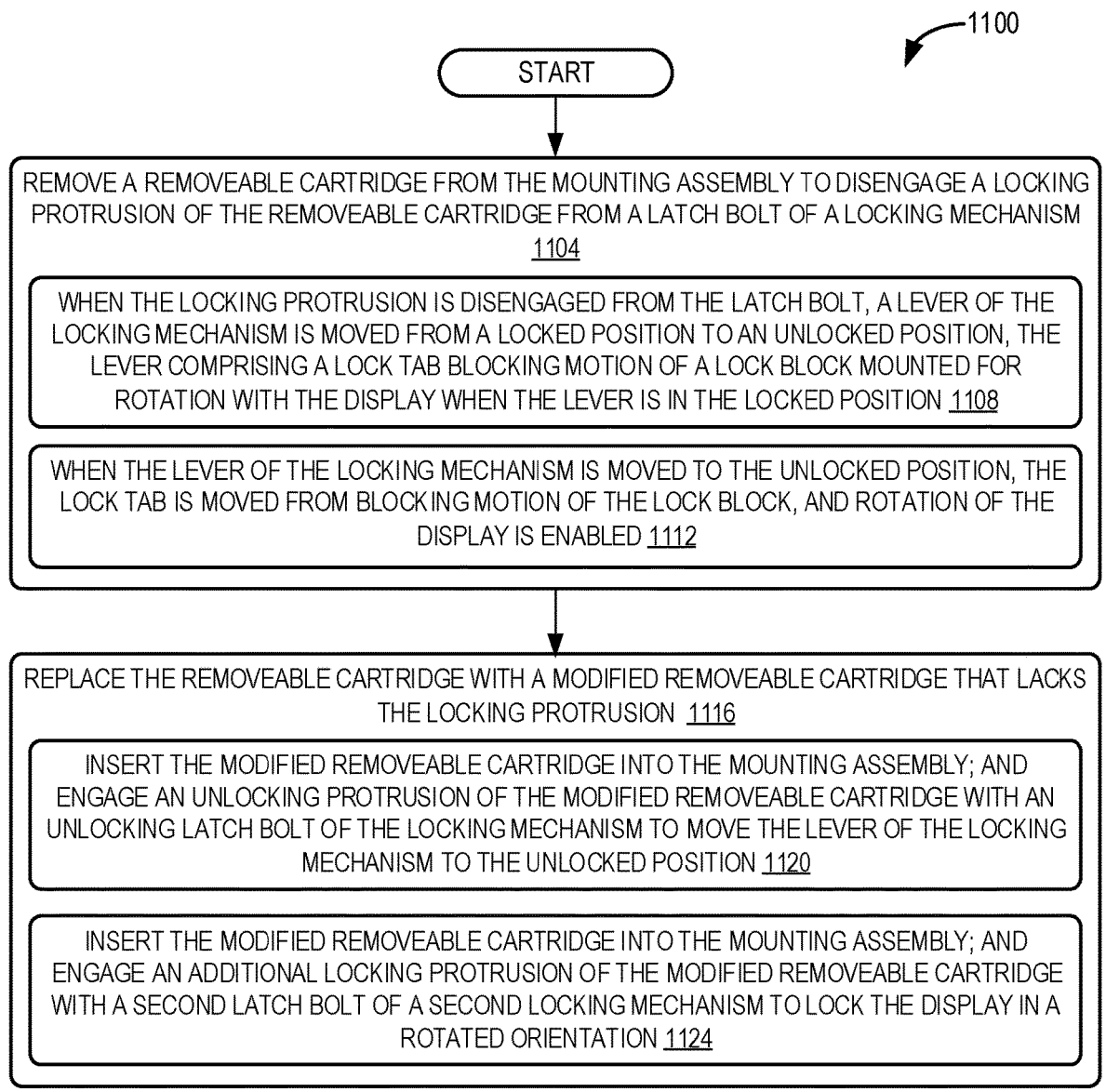
FIG. 12 is a block diagram of a method for modifying a display assembly to enable rotation of a display according to examples of the present disclosure.

With reference now to FIG. 12, a flow diagram is provided depicting an example method 1100 for modifying a mounting assembly of a display assembly to enable rotation of a display. The following description of method 1100 is provided with reference to the components described herein and shown in FIGS. 1-11. It will be appreciated that method 1100 also may be performed in other contexts using other suitable components.

At 1104, the method 1100 includes removing a removeable cartridge from the mounting assembly to disengage a locking protrusion of the removeable cartridge from contacting a latch bolt of a locking mechanism. At 1108, the method 1100 may include, when the locking protrusion is disengaged from the latch bolt, a lever of the locking mechanism is moved from a locked position to an unlocked position, the lever comprising a lock tab blocking motion of a lock block mounted for rotation with the display when the lever is in the locked position. At 1112, the method 1100 may include, when the lever of the locking mechanism is moved to the unlocked position, the lock tab is moved from blocking motion of the lock block, and rotation of the display is enabled.

At 1116, the method 1100 may include replacing the removeable cartridge with a modified removeable cartridge that lacks the locking protrusion. At 1120, the method 1100 may include, wherein the modified removeable cartridge comprises an unlocking protrusion, the method further comprising: inserting the modified removeable cartridge into the mounting assembly; and engaging the unlocking protrusion of the modified removeable cartridge with an unlocking latch bolt of the locking mechanism to move the lever of the locking mechanism to the unlocked position. At 1124, the method 1100 may include inserting the modified removeable cartridge into the mounting assembly; and engaging an additional locking protrusion of the modified removeable cartridge with a second latch bolt of a second locking mechanism to lock the display in a rotated orientation.

The following paragraphs provide additional support for the claims of the subject application. One aspect provides a locking mechanism for selectively allowing rotation of a display, the display rotatably coupled to a mounting assembly, the locking mechanism comprising: a lock block mounted for rotation with the display; and a lever rotatably coupled to a plate of the mounting assembly, the lever comprising a lock tab that blocks movement of the lock block when the lever is in a locked position and allows movement of the lock block when the lever is in an unlocked position. The locking mechanism may additionally or alternatively include a bumper located between the display and the mounting assembly, wherein the bumper is compressed when the lever is in the locked position. The locking mechanism may additionally or alternatively include, wherein the lock block comprises a ramped surface at a distal end.

The locking mechanism may additionally or alternatively include at least one biaser that biases the lever toward (a) the locked position, (b) the unlocked position, or (c) a centered position. The locking mechanism may additionally or alternatively include, wherein the biaser comprises a spring, magnets, or a cam and follower.

The locking mechanism may additionally or alternatively include at least one latch bolt extending from a distal end of the lever. The locking mechanism may additionally or alternatively include, wherein the lock block is biased toward the lock tab to pre-load the lock block against the lock tab when the lever is in the locked position.

Another aspect provides a display assembly, comprising: a mounting assembly; a display rotatably coupled to the mounting assembly; a removeable cartridge comprising at least one protrusion; and a locking mechanism comprising: a lock block mounted for rotation with the display; and a lever rotatably coupled to a plate of the mounting assembly, the lever comprising: a lock tab that blocks movement of the lock block when the lever is in a locked position and allows movement of the lock block when the lever is in an unlocked position; and a latch bolt; wherein the at least one protrusion of the removeable cartridge is configured to either (1) engage the latch bolt to move the lever into the locked position or (2) engage the latch bolt to move the lever into the unlocked position.

The display assembly may additionally or alternatively include, wherein the removeable cartridge comprises two or more protrusions. The display assembly may additionally or alternatively include, wherein the at least one protrusion is removeably coupled to the removeable cartridge. The display assembly may additionally or alternatively include, wherein the removeable cartridge comprises a plurality of apertures configured to receive the at least one protrusion. The display assembly may additionally or alternatively include, wherein the locking mechanism is a landscape locking mechanism configured to lock the display in a landscape orientation, the display assembly further comprising a portrait locking mechanism configured to lock the display in a portrait orientation that is 90 degrees offset from the landscape orientation.

The display assembly may additionally or alternatively include a bumper located between the display and the mounting assembly, wherein the bumper is compressed when the lever is in the locked position. The display assembly may additionally or alternatively include, wherein the lock block comprises a ramped surface at a distal end.

The display assembly may additionally or alternatively include at least one biaser that biases the lever toward (a) the locked position, (b) the unlocked position, or (c) a centered position. The display assembly may additionally or alternatively include, wherein the biaser comprises a spring, magnets, or a cam and follower. The display assembly may additionally or alternatively include, wherein the lock block is biased toward the lock tab to pre-load the lock block against the lock tab when the lever is in the locked position.

Another aspect provides a method for modifying a mounting assembly of a display assembly to enable rotation of a display, the method comprising: removing a removeable cartridge from the mounting assembly to disengage a locking protrusion of the removeable cartridge from a latch bolt of a locking mechanism, wherein when the locking protrusion is disengaged from the latch bolt, a lever of the locking mechanism is moved from a locked position to an unlocked position, the lever comprising a lock tab blocking motion of a lock block that is fixedly coupled to the display when the lever is in the locked position, and wherein when the lever of the locking mechanism is moved to the unlocked position, the lock tab is moved from blocking motion of the lock block, and rotation of the display is enabled.

The method may additionally or alternatively include replacing the removeable cartridge with a modified removeable cartridge that lacks the locking protrusion. The method may additionally or alternatively include, wherein the modified removeable cartridge comprises an unlocking protrusion, the method further comprising: inserting the modified removeable cartridge into the mounting assembly; and engaging the unlocking protrusion of the modified removeable cartridge with an unlocking latch bolt of the locking mechanism to move the lever of the locking mechanism to the unlocked position.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A locking mechanism for selectively allowing rotation of a display, the display affixed to a first plate that is rotatably coupled to a second plate of a mounting assembly, the locking mechanism comprising:
   a lock block mounted on the first plate for rotation with the display; and
   a lever rotatably coupled to the second plate of the mounting assembly, the lever comprising a lock tab that blocks rotation of the lock block and the display when the lever is in a locked position and allows rotation of the lock block and the display when the lever is in an unlocked position.

2. The locking mechanism of claim 1, further comprising a bumper located between the display and the mounting assembly, wherein the bumper is compressed when the lever is in the locked position.

3. The locking mechanism of claim 1, wherein the lock block comprises a ramped surface at a distal end.

4. The locking mechanism of claim 1, further comprising at least one biaser that biases the lever toward (a) the locked position, (b) the unlocked position, or (c) a centered position.

5. The locking mechanism of claim 4, wherein the biaser comprises a spring, magnets, or a cam and follower.

6. The locking mechanism of claim 1, further comprising at least one latch bolt extending from a distal end of the lever.

7. The locking mechanism of claim 1, wherein the lock block is biased toward the lock tab to pre-load the lock block against the lock tab when the lever is in the locked position.

8. A display assembly, comprising:
   a mounting assembly;
   a display rotatably coupled to the mounting assembly;
   a removeable cartridge comprising at least one protrusion; and
   a locking mechanism comprising:
      a lock block mounted for rotation with the display; and a lever rotatably coupled to a plate of the mounting assembly, the lever comprising:
  a lock tab that blocks movement of the lock block when the lever is in a locked position and allows movement of the lock block when the lever is in an unlocked position; and
  a latch bolt;
  wherein the at least one protrusion of the removeable cartridge is configured to either (1) engage the latch bolt to move the lever into the locked position or (2) engage the latch bolt to move the lever into the unlocked position.

9. The display assembly of claim 8, wherein the removeable cartridge comprises two or more protrusions.

10. The display assembly of claim 8, wherein the at least one protrusion is removeably coupled to the removeable cartridge.

11. The display assembly of claim 10, wherein the removeable cartridge comprises a plurality of apertures configured to receive the at least one protrusion.

12. The display assembly of claim 8, wherein the locking mechanism is a landscape locking mechanism configured to lock the display in a landscape orientation, the display assembly further comprising a portrait locking mechanism configured to lock the display in a portrait orientation that is 90 degrees offset from the landscape orientation.

13. The display assembly of claim 8, further comprising a bumper located between the display and the mounting assembly, wherein the bumper is compressed when the lever is in the locked position.

14. The display assembly of claim 8, wherein the lock block comprises a ramped surface at a distal end.

15. The display assembly of claim 8, further comprising at least one biaser that biases the lever toward (a) the locked position, (b) the unlocked position, or (c) a centered position.

16. The display assembly of claim 15, wherein the biaser comprises a spring, magnets, or a cam and follower.

17. The display assembly of claim 15, wherein the lock block is biased toward the lock tab to pre-load the lock block against the lock tab when the lever is in the locked position.

18. A method for modifying a mounting assembly of a display assembly to enable rotation of a display, the method comprising:
  removing a removeable cartridge from the mounting assembly to disengage a locking protrusion of the removeable cartridge from a latch bolt of a locking mechanism,
  wherein when the locking protrusion is disengaged from the latch bolt, a lever of the locking mechanism is moved from a locked position to an unlocked position, the lever comprising a lock tab blocking motion of a lock block that is fixedly coupled to the display when the lever is in the locked position, and
  wherein when the lever of the locking mechanism is moved to the unlocked position, the lock tab is moved from blocking motion of the lock block, and rotation of the display is enabled.

19. The method of claim 18, further comprising replacing the removeable cartridge with a modified removeable cartridge that lacks the locking protrusion.

20. The method of claim 18, wherein the modified removeable cartridge comprises an unlocking protrusion, the method further comprising:
  inserting the modified removeable cartridge into the mounting assembly; and
  engaging the unlocking protrusion of the modified removeable cartridge with an unlocking latch bolt of the locking mechanism to move the lever of the locking mechanism to the unlocked position.

* * * * *